Figure 1:
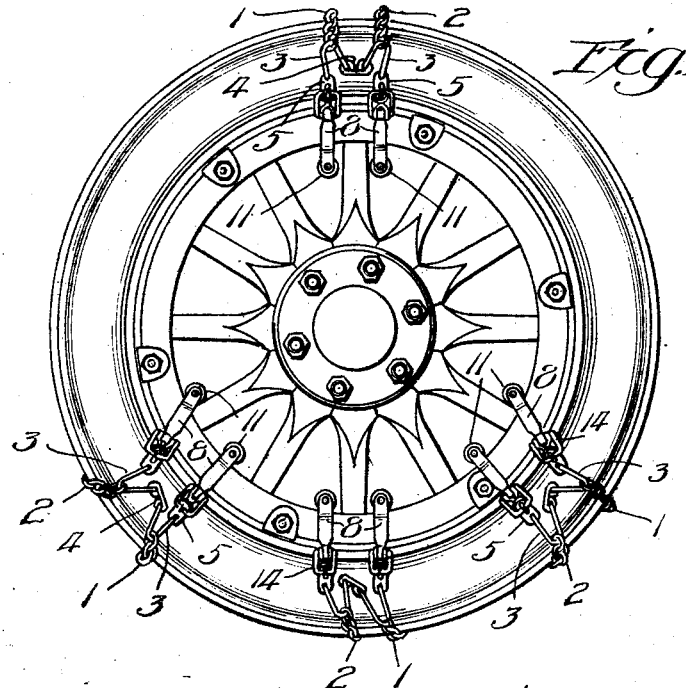

June 23, 1925.

C. T. HOOD

SINGLE UNIT TIRE CHAIN

Filed Dec. 15, 1924

1,543,436

Inventor:
C. T. Hood,
By Wm. F. Freudenreich,
Atty

Patented June 23, 1925.

1,543,436

UNITED STATES PATENT OFFICE.

CALVIN T. HOOD, OF CHICAGO, ILLINOIS.

SINGLE-UNIT TIRE CHAIN.

Application filed December 15, 1924. Serial No. 756,135.

*To all whom it may concern:*

Be it known that I, CALVIN T. HOOD, a citizen of the United States, residing in Chicago, county of Cook, State of Illinois, have invented a certain new and useful Improvement in Single-Unit Tire Chains, and declare the following to be a full, clear, and exact description of the same, such as will enable others skilled in the art to which it pertains to make and use the same, reference being had to the accompanying drawing, which forms a part of this specification.

Any kind of chain or rope or wire placed over a tire casing will assist securing traction in mud, sand or snow, and will to some degree help in starting and stopping on a slippery road; but, unless especially constructed will be of little or no service in preventing skidding on a slippery road. Furthermore, when the chain or the like is fixed so as to be immovable on the tire casing, the wheel passes over it so quickly that the resistance offered thereby is but slight. Furthermore a tight chain or the like, bearing constantly on the same spots, rapidly wears the tire casing. The common ladder-like continuous chain, arranged loosely over the tire casing, answers the requirements of service satisfactorily; but there are conditions under which it is difficult to apply the ordinary continuous chains, and such chains possess certain disadvantages that have led to the development of many different kinds of small individual units, any desired number of which may be attached to a wheel across the tire casing.

So far as I know, none of these single or individual units have been reasonably satisfactory for, even where they utilized the desirable short cross chain, they have not made possible that degree of looseness of the cross chain that permits it to travel freely along the tire casing so as to permit it to remain in contact with both the casing and the ground for a considerable length of time and also to adjust itself in different positions, as does the ordinary continuous chain, and thereby avoid excessive wear at a few predetermined points on the casing.

The object of the present invention is to produce a simple and novel individual tire chain unit that shall possess substantially all of the desirable characteristics of the ordinary endless ladder-like chain, so far as operation is concerned, and shall, in addition, have the desirable characteristics that have produced the demand for individual or single units.

Briefly stated, my improved unit consists of two cross chains of any usual or suitable construction which, for the sake of convenience, are however preferably of the same kind now employed in the continuous ladder-like chains. These two cross chains are connected together at their ends, and the two ends of each chain are also connected together by means passing underneath the felloe or rim of the wheel, one fastening and holding means being adapted to lie on one side of the spoke and the other on the opposite side of the spoke; the parts being so proportioned that the cross chains are quite loose and may move along the tire casing over a considerable angular distance, there being no permanent attachment to any part of the wheel, and the movements of the chains being limited only by the amount of slack that can be taken up before one of the holding devices is arrested by the adjacent wheel spoke. If one of the cross chains breaks, the unit is still held in place by the other cross chain and therefore does not drop off and become lost. Furthermore, whenever a cross chain breaks, it is a simple matter to replace it with one of the conventional cross chains commonly used. The holding means for the cross chains are provided with detachable fastenings, preferably buckles, which permit a unit to be conveniently applied and at the same time afford some adjustment to adapt a unit to wheels and tires of different sizes.

Figure 2:
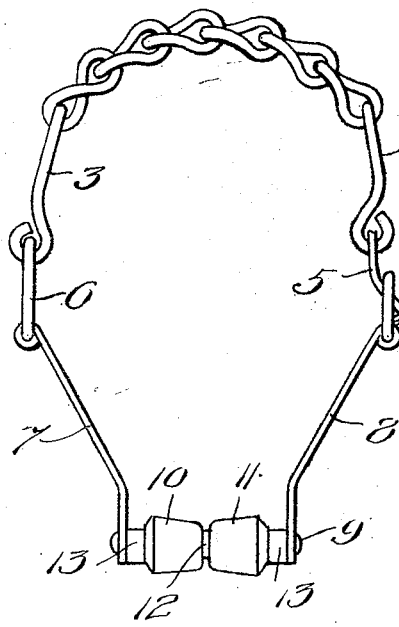
Figures 3, 4:
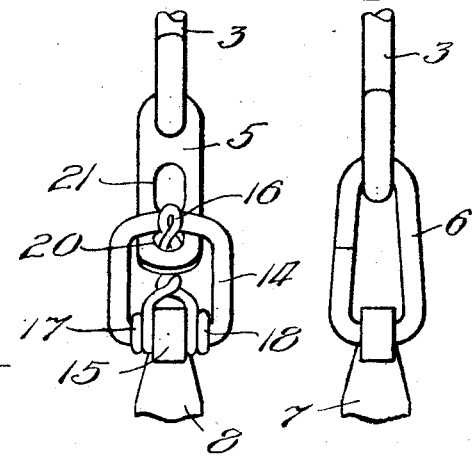

The various features of novelty whereby my invention is characterized will hereinafter be pointed out with particularity in the claims; but, for a full understanding of my invention and of its objects and advantages, references may be had to the following detailed description taken in connection with the accompanying drawing, wherein:

Figure 1 is a side elevation of a conventional automobile wheel having applied thereto several of my improved devices; Fig. 2 is an elevation of one of the devices; Fig. 3 is a detail on an enlarged scale, showing one of the detachable connections for the cross chains and Fig. 4 is a view similar to Fig. 3 showing the permanent connection of one of the cross chains at the opposite end from that shown in Fig. 3.

Referring to the drawing, 1 and 2 represent two cross chains, preferably of the same length as those at present found in the endless ladder-like chains. At each end of each of the chains is a U-shaped link 3. Two of the arms of the U-shaped links, at each end of the two chains, are connected together by a short link 4 which consists preferably of a short rod having its ends bent into eyes passing through eyes at the ends of the arms of the links 3. In this respect the construction on the opposite side of the wheel from that appearing in Fig. 1 is the same as in Fig. 1 and therefore further illustration is unnecessary. The other arm of each of the links 3, at one end of the cross chains, is connected to a special link 5, forming the strap of a buckle device, as best shown in Fig. 3; while the remaining arms of the links 3 at the other end of the cross chains are connected to simple closed links 6 as best shown in Fig. 4.

Each cross chain is provided with an individual holding means consisting of a U-shaped member or yoke adapted to extend underneath and embrace the rim or felloe of the wheel to which the device is applied. In the arrangement shown, each of these yokes consists of two arms 7 and 8 fastened together and held in spaced relation to each other at one end by a cross piece 9 on which are loosely disposed two rollers 10 and 11. Between the rollers is a washer or spacing device 12, and between each roller and the adjacent arm is a spacer 13. The rollers are frustums of cones, the larger ends being at the outer sides. The free end of the arm 7 is connected to the link 6, while the free end of the arm 8 has fastened to it the loop 14 of a buckle. The extreme end of the arm 8 is narrowed and is bent around the middle of one of the bars of the buckle member 14, as indicated at 15. The tongue 16 of the buckle is conveniently made of a piece of wire doubled upon itself and twisted for a portion of its length, while the free ends are bent around that element of the member 14 to which the arm 8 is connected; thus forming two hinge knuckles 17 and 18 lying on opposite sides of the part 15 of the arm of the yoke. The strap 5 is provided with a plurality of holes 20 and 21 through either of which the tongue of the buckle may be projected without the strap 5 as passed through the loop of the buckle.

The device is attached to a wheel by unfastening the buckles, placing the yokes underneath the felloe or rim on opposite sides of a spoke, bringing the cross chains across the top of the tire casing, and then fastening the buckles. It will be seen that the device may be quickly and easily fastened to a wheel, under substantially every condition that may be encountered. The conical rollers engage with the underside of the felloe and cause the device properly to track and remain centered. By spreading the arms of the yokes or bending them so as to bring them closer together, the yokes may be shaped to fit rims of various sizes, additional adjustment being afforded by the buckles.

In Figure 1 there is shown a vehicle wheel having thereon four of my improved devices, so placed as to illustrate the principal positions taken thereby in actual service. It will be seen that the rollers of the device at the top of the wheel hang down a considerable distance below the overlying portions of the rim, so that the chains simply lie loosely on the tire casing and can readily be shifted on the casing in any direction. The wheel is assumed to be rotating in the counter-clockwise direction. Therefore the device on the left is shown as having dropped down by gravity until the roller on the trailing yoke has been arrested by a spoke, while the yoke that is in advance has traveled half way to the other spoke. The cross chains are spread apart farther than they are in the upper device, due to the fact that the main support for the entire device is now the trailing set of rollers. Very little change takes place as the device at the left approaches the bottom but then, as one of the two cross chains after the other comes in contact with the ground, the chains now being full of slack because the rollers are engaged with the rim and the chains tend to hang down clear of the tire casing, they remain in contact with the ground while the wheel travels through a considerable angle, the trailing chain being eventually drawn forward closer to the chain in advance. Therefore the wheel is given traction during the entire time that it is traveling through a considerable angle, the chains resting on the ground and the wheel rolling on them. Then, as the wheel continues to rotate, the device assumes the position shown at the right, the advance yoke serving as the support, and the trailing yoke dropping back from the spoke with which it was engaged, while in the position corresponding to the left hand device. The chains are again loose on the tire casing so that by the time that the device again reaches the top of the wheel the parts assume the positions of the device shown in the drawing at the top.

It will thus be seen that in the use of my improved device the chains are at all times loose, even while they are resting on the ground, with the exception that at some point each chain may become taut while engaged with the ground, depending upon the condition of the ground and the speed of rotation of the wheel. As a result, there is no more tendency for the cross chains to injure the tire casing than is true of the common continuous, ladder-like chains.

Since the cross chains are entirely loose even at the time of first contact with the ground, each can slide or creep for a considerable distance on the tire casing before the wheel casing passes over it when the brakes are set, or if the vehicle skids, or in case the road does not afford the wheel good traction; thus providing increased traction in stopping, starting or running and increased resistance to skidding.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A single unit tire chain comprising two closed flexible loops adapted to extend loosely about a tired wheel rim on opposite sides of a wheel spoke, and flexible connections between said loops at points that are located on opposite sides of said rim when the device is on a wheel.

2. A single unit tire chain comprising two closed flexible loops adapted to extend around a tired wheel rim on opposite sides of a wheel spoke, said loops being much longer than the distance around a cross section of the rim, and connections between said loops at points that lie on opposite sides of the rim when the device is on a wheel.

3. A single unit tire chain comprising two yokes each consisting of a cross piece adapted to extend underneath the rim of a spoked wheel and two arms adapted to extend outwardly on opposite sides of said rim, a cross chain connected at its ends to the free ends of the arms of each yoke forming therewith a closed loop much longer than the distance around the rim, the connection between at least one end of each chain and the corresponding yoke being detachable, and flexible connections between the loops in the vicinity of the ends of the chains.

4. A single unit tire chain comprising two yokes each consisting of a cross piece adapted to extend underneath the rim of a spoked wheel and two arms adapted to project outwardly on opposite sides of the rim, two cross chains each connected at one end to an arm of one of the yokes, an adjustable fastening in the form of a buckle and strap between the other end of each chain and the other arm of the corresponding yoke, the parts being so proportioned that each yoke and chain will constitute a closed loop about a rim much longer than the distance around the rim so that each loop is quite loose on the rim, said cross pieces having thereon rollers increasing in diameter from the middle of the pieces toward the ends, and short flexible connections between said loops adjacent to the ends of the chains.

In testimony whereof, I sign this specification.

CALVIN T. HOOD.